United States Patent
Bai et al.

(10) Patent No.: US 9,173,156 B2
(45) Date of Patent: Oct. 27, 2015

(54) METHOD AND SYSTEM FOR TRANSFERRING INFORMATION IN VEHICULAR WIRELESS NETWORKS

(75) Inventors: Fan Bai, Ann Arbor, MI (US); Nawaporn Wisitpongphan, Bangkok (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 133 days.

(21) Appl. No.: 13/564,924

(22) Filed: Aug. 2, 2012

(65) Prior Publication Data

US 2013/0034016 A1  Feb. 7, 2013

Related U.S. Application Data

(60) Provisional application No. 61/515,383, filed on Aug. 5, 2011.

(51) Int. Cl.
| | |
|---|---|
| *H04L 12/28* | (2006.01) |
| *H04W 40/28* | (2009.01) |
| *H04W 84/18* | (2009.01) |
| *H04W 88/04* | (2009.01) |

(52) U.S. Cl.
CPC .............. *H04W 40/28* (2013.01); *H04W 84/18* (2013.01); *H04W 88/04* (2013.01)

(58) Field of Classification Search
CPC . H04W 40/02; H04W 40/08; H04W 52/0229; H04L 45/308; H04L 67/1095
USPC ................. 370/328, 254, 253, 334, 338, 351; 709/222, 226
See application file for complete search history.

(56) References Cited

U.S. PATENT DOCUMENTS

| | | | |
|---|---|---|---|
| 2008/0095134 A1* | 4/2008 | Chen et al. ..................... | 370/342 |
| 2009/0073893 A1* | 3/2009 | Vu Duong et al. ............. | 370/253 |
| 2009/0274093 A1* | 11/2009 | Senouci et al. ................ | 370/328 |

(Continued)

FOREIGN PATENT DOCUMENTS

| | | |
|---|---|---|
| DE | 603 18 428 | 1/2003 |
| DE | 602 22 282 | 9/2007 |

OTHER PUBLICATIONS

Wen-Hwa et al. "A TDMA.-based Bandwidth Reservation Protocol for QoS Routing in a Wireless Mobile Ad Hoc Network" 2002 IEEE.

(Continued)

*Primary Examiner* — Andrew Lai
*Assistant Examiner* — Jamaal Henson
(74) *Attorney, Agent, or Firm* — Mark S. Cohen; Pearl Cohen; Zedek Latzer Baratz LLP

(57) ABSTRACT

A method and system may receive, at an intermediate vehicle, a route request packet from a source vehicle. The system and method may enter a routing entry comprising a path from intermediate vehicle to the source vehicle and a quality metric value in a routing table. The method and system may receive, at a destination vehicle, the route request packet broadcast from one or more intermediate vehicles. The method and system may transmit, along a path from the destination vehicle to source vehicle, a route reply message. The method and system may transfer data from the source vehicle to the destination vehicle along the path. The method and system may monitor one or more quality metric values associated with the data transferred to the destination vehicle along the path.

10 Claims, 20 Drawing Sheets

(56) References Cited

U.S. PATENT DOCUMENTS

2010/0250747 A1* 9/2010 Karaoguz et al. ............. 709/226
2010/0278069 A1* 11/2010 Sharma et al. ................ 370/254

OTHER PUBLICATIONS

Leung-et-al. "MP-DSR: A QoS-aware Multi-path Dynamic Source Routing Protocol for Wireless Ad-Hoc Networks" 2001 IEEE.

DE Office Action application No. 10 2012 213 799.8 dated Jan. 8, 2014.

Office Action CN application No. 201210379949.8 Dated Oct. 20, 2014.

N Sarma et al. "A Route Stability based Multipath QoS Routing (SMQR) in MANETs" 2008 IEEE Computer Society.

* cited by examiner

```
RREQ_Received(p) {
  if(Is_First_RREQ(p) == false) {
    //discard RREQ if it came from a route
    //with worse QoS
  }
  if(p.destIP == myIP) {
    if(Has sent RREP to p.srcIP) {
      //discard RREQ
    } else {
      //update routing table to p.srcIP
      //set timer to send out RREP or
      //update the RREP content
    }
  } else {
    forward(RREP pkt)
  }
}
```

FIG. 6D

```
RREP_Received(p){
    //Update the routing entry for p.srcIP
    /*Check if this node is the src of RREQ packet*/
    if(p.destIP == myIP) {
        //Turn QoS_Monitoring_Flag on for p.srcIP entry
        //in the routing table
    } else {
        //Turn Is_Relay_Node_Flag on for p.srcIP entry
        //in the routing table forward(p)
    }
}
```

FIG. 7D

```
Hello_Timer_Expiry() {
    for all dest in the routing table {
        if(dest.Is_Relay_Node_Flag == true) {
            //Add RQV of remote neighbors
            if(now - last_update_time > update_interval) {
                //Add QV of immediate neighbors
            }
        }
    }
    send(hello_pkt);
}
```

FIG. 9B

```
HelloPkt_Received(p){
  update_link_stat(p);
  update_path_stat(p);
  for all dest in the routing table {
    if (dest.QoS_Monitoring_Flag == true) {
      if(dest.QoS < QoS_Threshold) {
        route_discovery(dest);
      }
    }
  }
}
```

FIG. 12B

METHOD AND SYSTEM FOR TRANSFERRING INFORMATION IN VEHICULAR WIRELESS NETWORKS

BACKGROUND OF THE INVENTION

Many vehicles are equipped with devices to output information to vehicle occupants. Vehicles may, for example, be equipped with devices to display video or images (e.g., video screen, display device, etc.), broadcast audio (e.g., audio system, radio, Internet based radio), display information (e.g., navigation systems), or otherwise output data. Vehicle devices may output content based on data received over a wireless network (e.g., Wi-Fi network). Content output based on data received over a wireless network may, for example, include video (e.g., movies, video clips, internet videos), streaming audio (e.g., Internet radio, podcasts), or other information. The quality of video, audio, or other information output in a vehicle may be related to quality of signal received in antennas associated with vehicle. A reliable network connection may, for example, allow for higher quality video, audio and other information to be output in vehicle.

A vehicle may, for example, receive data and information broadcast from antennas associated with infrastructure (e.g., buildings, man-made structures, etc.). Vehicles may often not be in the range of antennas associated with infrastructure. Vehicles, however, may be in the range of other vehicles when not in the range of infrastructure.

SUMMARY OF THE INVENTION

A method and system may receive, at an intermediate vehicle, a route request packet from a source vehicle. The system and method may enter a routing entry comprising a path from intermediate vehicle to the source vehicle and a quality metric value in a routing table. The method and system may receive, at a destination vehicle, the route request packet broadcast from one or more intermediate vehicles. The method and system may transmit, along a path from the destination vehicle to source vehicle, a route reply message. The method and system may transfer data from the source vehicle to the destination vehicle along the path. The method and system may monitor one or more quality metric values associated with the data transferred to the destination vehicle along the path.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 6D is non-limiting, sample code that may be used to implement the request phase of FIG. 6A-6C, according to embodiments;

FIG. 7D is a non-limiting, sample code that may be used to implement the reply stages of FIGS. 7A-7C, according to embodiments;

FIG. 9B is non-limiting, sample code that may be used to implement the service monitoring operation of FIG. 9A, according to embodiments;

FIG. 12B is non-limiting, sample code that may be used to implement the route migration of FIG. 12A, according to embodiments.

Figure 1:
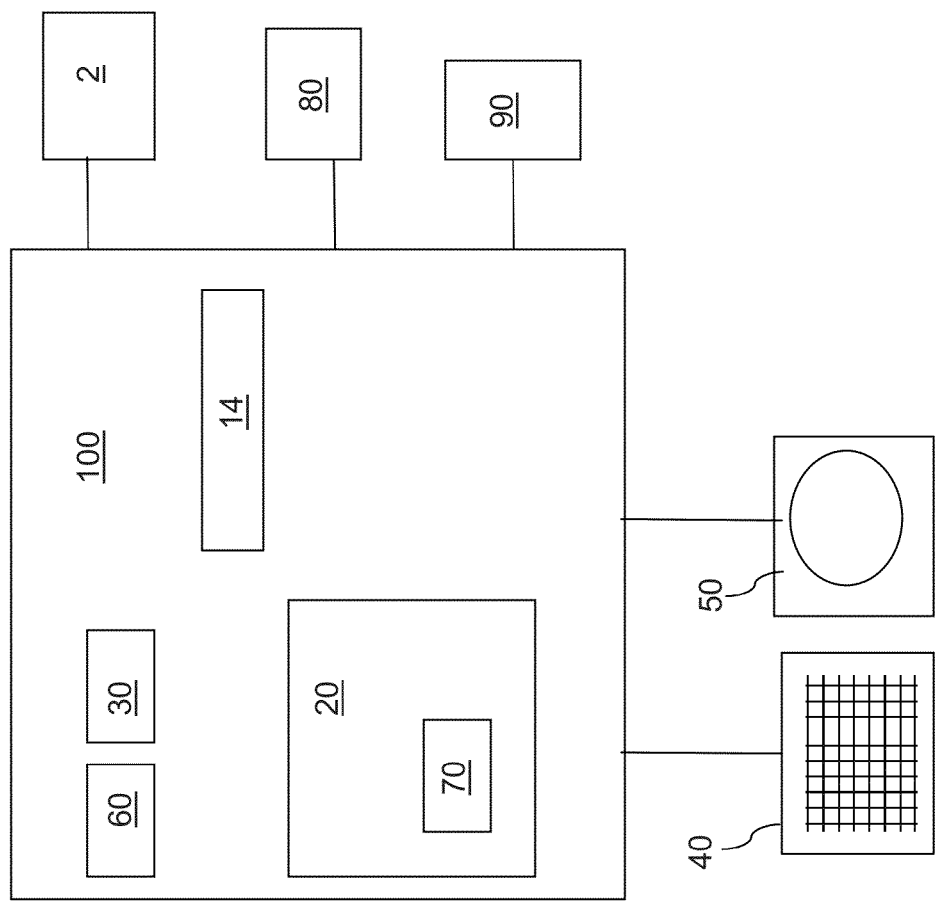
FIG. 1 is a schematic diagram of a vehicle with a vehicle information network system according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. It will however be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing," "computing," "storing," "determining," "evaluating," "calculating," "measuring," "providing," "transferring," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 is a schematic diagram of a vehicle with a vehicle information network system according to an embodiment of the present invention. A vehicle 2 (e.g., a car, truck, or another vehicle) may include vehicle information network system 100. Vehicle information network system 100 may operate in conjunction with vehicle information display systems 80 (e.g., video display systems, audio systems, entertainment systems, navigation systems, etc.), communication systems 90 (e.g., cellular telephone systems, etc.) and possibly other systems.

One or more antenna(s) 10, for example, radio frequency (RF) antenna(s) 12, cellular antenna(s) 14, or other types of antenna(s) may be attached to, connected to, or associated with the system 100 and/or vehicle 2. Antenna(s) 10 may, for example, send and receive signals, information, communication, and data from antenna(s) associated with other vehicle(s), infrastructure or other devices; femtocells; or other devices. Antenna(s) 10 may, for example, send and received signals to and from other vehicle(s), infrastructure, or other devices over a wireless network. A wireless network used may, for example, be a Wi-Fi network (e.g., a network configured according to IEEE 802.11 family of standards), a dedicated short-range communications (DSRC) network, long-term evolution (LTE) peer-to-peer network, wireless local area network (WLAN), Wi-Fi peer-to-peer (e.g., Wi-Fi direct), personal area network (PAN), wide area network (WAN), Super Wi-Fi, local area network (LAN), or other type of network.

Vehicle information network system 100 may include one or more processor(s) or controller(s) 60, memory 20, long term storage 30, input device(s) or area(s) 40, and output device(s) or area(s) 50. Input device(s) or area(s) 40 may be, for example, a touchscreen, a keyboard, microphone, pointer device, or other device. Output device(s) or area(s) 50 may be, for example, a display, screen, audio device such as speaker or headphones, or other device. Input device(s) or area(s) 40 and output device(s) or area(s) 50 may be combined into, for example, a touch screen display and input which may be part of system 100.

System 100 may include one or more databases 70, which may include, for example, routing table(s), routing table entries, quality of service metric or characteristic values, signal route or path information, and or other information or data. Databases 70 may be stored all or partly in one or both of memory 20, long term storage 30, or another device.

Processor or controller 60 may be, for example, a central processing unit (CPU), a chip or any suitable computing or computational device. Processor or controller 60 may include multiple processors, and may include general-purpose processors and/or dedicated processors such as graphics processing chips. Processor 60 may execute code or instructions, for example, stored in memory 20 or long-term storage 30, to carry out embodiments of the present invention. Processor 60 may, for example, be or may include a wireless network interface controller.

Memory 20 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 20 may be or may include multiple memory units.

Long term storage 30 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Figure 2:
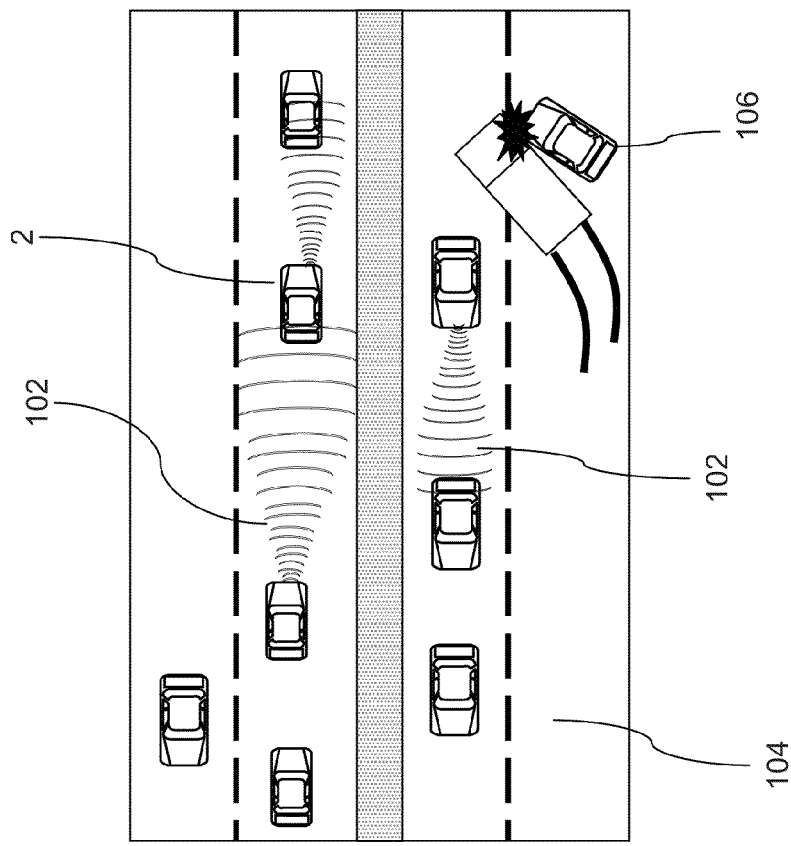
FIG. 2 is a schematic illustration of multiple vehicles using vehicle information network systems according to embodiments of the present invention.

FIG. 2 is a schematic illustration of multiple vehicles using vehicle information network systems according to embodiments of the present invention. Vehicles 2 may transfer signals 102 (e.g., microwaves or other electromagnetic waves representing information, data, communications, etc.) to and receive signals from other vehicles 2. For example, a vehicle 2 may send a signal 102 to one vehicle, the vehicle may receive signal 102 and may, for example, rebroadcast or resend signal 102 to other vehicles 2. A vehicle 2 or a system in the vehicle 2 may, for example, detect an obstruction 106 in road 104 (e.g., objects involved in an accident, objects in road 104, etc.), capture video of an obstruction 106 in road 104, or other information. Vehicle 2 may broadcast signal 102 notifying vehicles or occupants of other vehicles 2 about an obstruction 106 in road 104. Signal 102 may, for example, include a video of, photograph of, or other information regarding the obstruction 106 in the road 104. Signal 102 may, for example, be broadcast to all vehicles 2 near obstruction 106 or within a threshold distance from obstruction 106. Signal 102 may, for example, be broadcast to a vehicle 2 behind or otherwise near vehicle 2. The vehicle 2 behind or otherwise near vehicle 2 may receive signal 102 and resend or rebroadcast signal 102 other vehicles 2 and/or may send a signal back to vehicle 2. Signals 102 may be, therefore, transferred from vehicle to vehicle in a network (e.g., a Wi-Fi network). Signals 102 may, in some embodiments, be transferred from a source vehicle 2 to a destination vehicle 2 via one or more intermediate vehicles 2.

Signals 102 may, in some embodiments, include multimedia files (e.g., video, audio, text, etc.) transferred from one vehicle 2 to another vehicle 2. For example, a police vehicle 2 near the scene or accident may capture video of the accident scene in a multimedia file. The multimedia file may be transferred from the police vehicle 2 at the scene of the accident to other police vehicles 2 in the area. In another example, groups of friends traveling in separate vehicles 2 may transfer video camera captured media, multimedia files (e.g., video, audio, pictures, etc.), and other information between separate vehicles 2.

Figure 3:
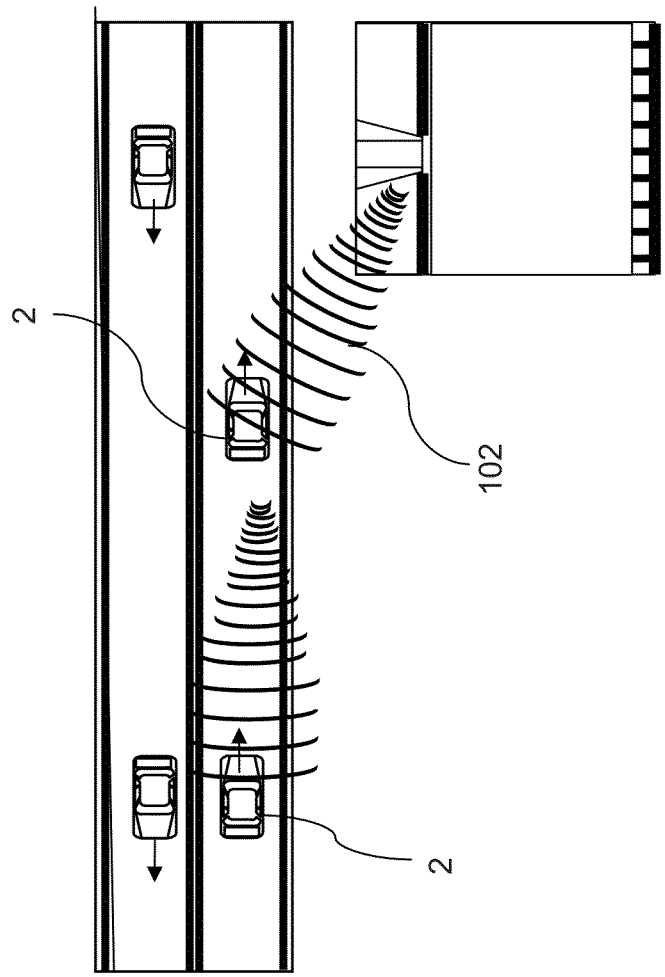
FIG. 3 is a schematic illustration of multiple vehicles using vehicle information network systems according to embodiments of the present invention.

FIG. 3 is a schematic illustration of multiple vehicles using vehicle information network systems according to embodiments of the present invention. Infrastructure or other transmitter 108 (e.g., buildings, businesses, stand-alone broadcast towers, portable devices such as portable access points, cellular telephones, personal computers, etc.) may broadcast signal(s) 102 to vehicles 2. Vehicles 2 may receive signal(s) 102 and may reply to signal(s) 102 or broadcast signal 102 to other vehicles. Vehicles 2 may output information to vehicle occupants (e.g., using output device(s) 50 or other devices) based on the signal 102. Signal 102 from infrastructure or other transmitter 108 may, for example, include an advertisement promoting a business associated with infrastructure 108, news, multimedia information (e.g., video, audio, or text), or other information.

Signals 102 may, in some embodiments, be transferred from vehicles 2 to infrastructure (e.g., cellular units, broadcast towers, etc.). For example, a video of an obstruction 106 (e.g., an accident) may be transferred from a source vehicle 2 to one or more intermediate vehicles 2, from intermediate vehicles 2 to a destination vehicle 2, and from a destination vehicle 2 to infrastructure (e.g., a road-side receiver to transfer the video to a city traffic management center).

Figure 4:
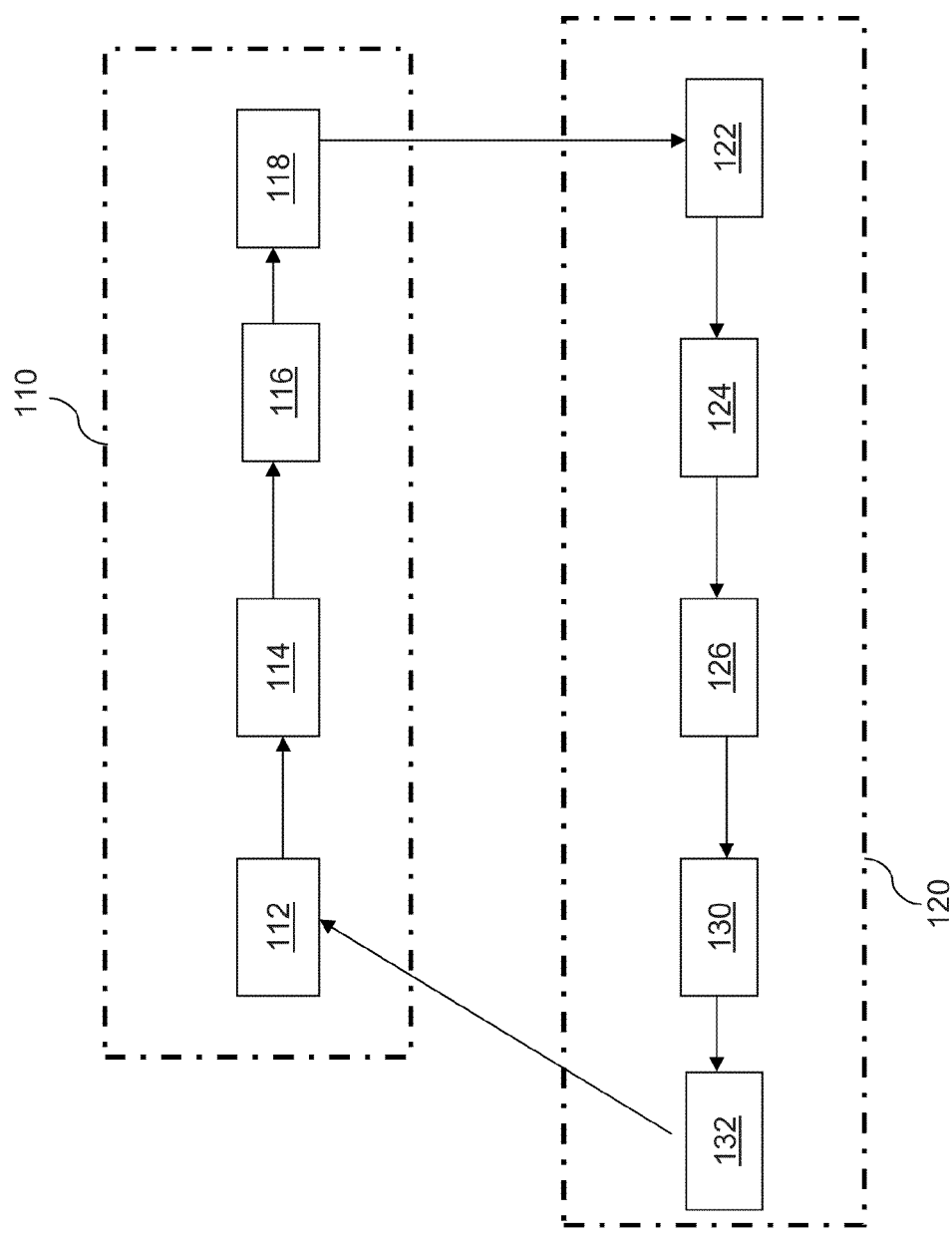
FIG. 4 is a schematic diagram of a vehicle information network according to embodiments of the present invention.

FIG. 4 is a flow diagram of a vehicle information network according to embodiments of the present invention. The functions depicted in FIG. 4 may be carried out by the system of FIG. 1 (or a combination of such systems) but may be carried out by other systems as well. A route establishment operation 110 may be used to establish a data, signal, or information route or routing path, or path from a source vehicle to a destination vehicle. The route or path may be a multi-hop or multiple link route or path from vehicle-to-vehicle between the source vehicle and the destination vehicle. A path may be, for example, a set or series of vehicles, nodes, or vehicle information network systems 100.

In operation, at step 112 an initial or first request may be generated and broadcast to establish a signal communication route or path between the source vehicle and destination vehicle may be made. The initial request may be included in a signal from infrastructure (e.g., an advertisement with instructions to broadcast to multiple vehicles), in information or data from a vehicle (e.g., streaming multimedia to be transferred to a destination vehicle), or in another data or information. A vehicle 2 (e.g., a source vehicle or node) may be received by another vehicle 114 (e.g., a destination vehicle or node). The source vehicle 2 may, for example, establish a route to another vehicle by broadcasting a route request (RREQ) message or packet. RREQ packet may, for example, include or specify a destination or target vehicle or node. The RREQ packet may be broadcast by source vehicle to all neighboring vehicles or nodes (e.g., in a vehicle network). Neighboring vehicles may receive the RREQ packet, and if the neighboring vehicle is not a destination vehicle (e.g., neighboring vehicle is an intermediate vehicle), the intermediate vehicle may rebroadcast the RREQ packet to its neighbors. Intermediate vehicle may, for example, enter a routing entry in a routing table associated with intermediate vehicle. Routing entry may include a path from the intermediate vehicle back to the source vehicle (e.g., via intermediate vehicles or directly to source vehicle) and a quality of service metric value.

The process may, for example, be repeated or continued until the target or destination vehicle receives the RREQ packet. Once the destination vehicle receives one or more RREQ messages, the destination vehicle may send or transmit a route reply (RREP) message along a path to source vehicle with the highest, most favorable, or best quality of service. Destination vehicle may, for example, send or transmit RREP message to a neighboring intermediate vehicle that is located along the path with the highest quality of service. The intermediate vehicle may receive the RREP message and may enter a routing entry in a routing table associated with the intermediate vehicle. The routing entry may include a path to the destination vehicle and a quality of service metric value. Intermediate vehicle may then send or transmit the RREP message to the next vehicle along the path (e.g., another intermediate vehicle or the source vehicle). The process may be repeated until the source vehicle receives the RREP packet. The source vehicle may enter a routing entry into a routing table associated with source vehicle. The routing entry may, for example, include a path to the destination vehicle and a quality of service metric value.

In step 116 the source vehicle receives the RREP message from the destination vehicle, possibly via intermediate vehicles thereby establishing a communication route or path. Routing table(s) 118 may, for example, represent or describe the paths or links (e.g., from vehicle-to-vehicle or multi-hop paths) from the source vehicle to destination vehicle and quality of service (QoS) characteristics or metrics (e.g., packet delivery ratio (PDR), delay, jitter, received signal strength information (RSSI), etc.) for each link and/or along the entire path.

According to some embodiments, during route maintenance operations 120, in step 122 quality of service (QoS) is monitored along the vehicle network path from the source vehicle to the destination vehicle. In step 124 errors 128 along the path, may be predicted, and/or may handle or corrected in step 130.

The quality of service (QoS) or quality metrics (e.g., packet delivery ratio (PDR), delay, jitter, RSSI, etc.) may, for example, be periodically measured or monitored 122 to ensure the QoS remains above a predefined threshold QoS. The QoS may, for example, be monitored 122 (e.g., by a processor 60 associated with the source vehicle, intermediate vehicle, destination vehicle or other vehicle) along the path from the source vehicle to one or more intermediate vehicles then to the destination vehicle. The QoS may, for example, be monitored 122 in the links between vehicles (e.g., between source vehicle and an intermediate vehicle, intermediate vehicles, an intermediate vehicle and destination vehicle). An aggregate quality of service metric may, in some embodiments, be monitored. Aggregate QoS metric may represent QoS along the entire path, a portion of entire path, or a portion of the entire path from source vehicle to destination vehicle. If QoS metric value along a path or in the links between vehicles increases, the QoS may be degraded or reduced possibly resulting in transmission errors during data streaming. A high QoS value may, for example, indicate reduced network quality or QoS along the path or in links between one or more vehicles. If, for example, the QoS metric value exceeds a predefined threshold QoS value, a potential route error may be predicted at step 126. If a route error is predicted, a route error (RERR) message or packet may be sent or transmitted back to the source vehicle to notify source vehicle in step 128. Upon notification, the source vehicle may, for example, handle the error and/or fix the route in step 130. The source vehicle may, for example, handle the error by sending a request in step 132 for route discovery. A new route from the source vehicle to the destination vehicle (e.g., from source to intermediate vehicles to destination vehicle or source to destination vehicle directly) may be established in the same manner as the original route. Thus, the route discovery process may be repeated or reinitiated to establish a path or route with sufficient quality of service (e.g., sufficient QoS for streaming video, audio or other data transfer requirements). Once a new route with QoS metric is discovered, the source vehicle will be notified and then it will seamlessly transit its previous route to this newly discovered route with sufficient QoS metric.

Figure 5:
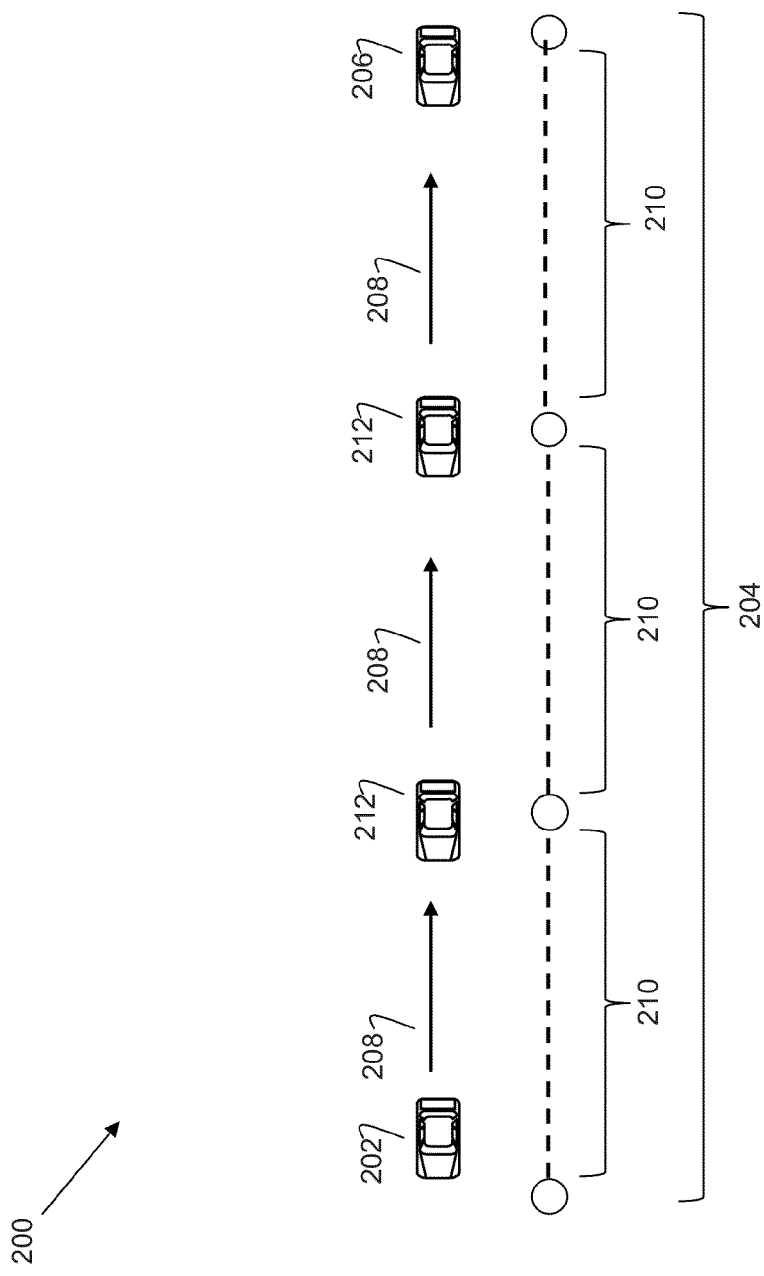
FIG. 5 is a schematic illustration of a vehicle information network according to embodiments of the present invention.

FIG. 5 is a schematic illustration of a vehicle information network according to embodiments of the present invention. A vehicle information network 200 may include multiple vehicles (e.g., a source vehicle 202, one or more intermediate vehicle(s) 212, and/or a destination vehicle 206). A source vehicle or node 202 may, for example, establish a path or route 204 to a destination vehicle or node 206. Destination vehicle 206 or a network address, identity or other information relating to destination vehicle 206 may, in some embodiments, be known in advance. For example, all police vehicles in a unit may have pre-registered the network address of all vehicles in the police unit prior to transferring information. Vehicles associated with a group of friends may determine the addresses of each vehicle during an address association operation or process prior to transmission of information. A path 204 may, for example, be established to stream multimedia data or information 208 (e.g., video, audio, or other type of information) from source vehicle 202 to destination vehicle 206. A path 204 may, for example, include one or more links 210 between vehicles or nodes. Data 208 may, for example, be transmitted, broadcast, or output from source vehicle 202 to one or more intermediate vehicles or nodes 212. Data 208 may, in some embodiments, be received by an intermediate vehicle 212 and rebroadcast to another intermediate vehicle 212, destination vehicle 206, or another vehicle. A path may, therefore, be or may include multiple links or hops 210 from source vehicle 202 to intermediate vehicle 212, from intermediate vehicle 212 to another intermediate vehicle 212, from intermediate vehicle 212 to destination vehicle 206, and/or from source vehicle 202 to destination vehicle 206. Other paths, links and combinations of vehicles may be used to transmit data.

According to some embodiments, quality of service (QoS) may be determined by measuring quality of service characteristics or metrics of each link (e.g., each outgoing link) or aggregate quality of service metrics of a path or route (e.g., a path from source vehicle to destination vehicle). Quality of service metrics may, for example, include packet delivery ratio (PDR), delay, jitter, RSSI or other quality of service metrics or characteristics. A route quality vector may, for example, be included in data 208 transferred from vehicle-to-vehicle (e.g. from source to intermediate, intermediate to intermediate, intermediate to destination, etc.). The route quality vector may be distance vector representation of QoS metrics (e.g., PDR, delay, jitter, RSSI, etc.).

Packet delivery ratio (PDR) may, for example, be QoS metric representing a probability or likelihood that a packet sent by a sender vehicle may be received by destination vehicle. An estimated pocket delivery ratio (PDR), $\tilde{P}(t)$, may, in some embodiments, be calculated or determined for each of the one or more links 210 in vehicle information network 200 (e.g., link-level PDR). An estimated link-level packet delivery ratio (PDR), $\tilde{P}(t)$, may, for example, be determined or calculated using, for example, an equation such as:

$$\tilde{P}(t)=\alpha \times P(t)+(1-\alpha)\times \tilde{P}(t-1)$$

The estimated packet delivery ratio (PDR), $\tilde{P}(t)$, may, for example, be based on a currently measured PDR, $P(t)$, a previously estimated (e.g., estimated at time t−1) PDR, $\tilde{P}(t-1)$, a weighting factor, $\alpha$, and/or other variables.

A packet delivery ratio may, in some embodiments, be calculated over a path 204 from source vehicle 202 to destination vehicle 206. A PDR for a path, $P_{Path}(t)$ may, for example, be determined or calculated using, for example, an equation such as:

$$P_{Path}(t) = \prod_i P^i_{link}(t)$$

An aggregate PDR for a path, $P_{path}(t)$, may, for example, be the product of a PDR for each link, $P_{link}^i(t)$, in path 204.

Delay may, in some embodiments, be a QoS metric representing a time to transfer a packet or message between two connected vehicles or nodes (e.g., link-level delay), or along a path from a source vehicle to a destination vehicle (e.g., end-to-end delay). An estimated link-level delay, $\tilde{\tau}(t)$, may, for example, be determined or calculated using, for example, an equation such as:

$$\tilde{\tau}(t)=\alpha \times \tau(t)+(1-\alpha)\times \tilde{\tau}(t-1)$$

The estimated link-level delay, $\tilde{\tau}(t)$, may, for example, be based on a currently measured delay, $\tau(t)$, a previously estimated (e.g., estimated at time t−1) delay, $\tilde{\tau}(t-1)$, a weighting factor, $\alpha$, and/or other variables.

Delay may, in some embodiments, be calculated over a path 204 from source vehicle 202 to destination vehicle 206. Delay over a path, $\tau_{Path}(t)$, may, for example, be determined or calculated using, for example, an equation such as:

$$\tau_{Path}(t) = \sum_i \tau^i_{link}(t)$$

The aggregate delay over a path 204 may, for example, be a sum of the one or more (e.g., i number) link-level delays, $\tau_{link}^i(t)$, along path 204.

Jitter may, in some embodiments, be a QoS metric derived from delay and may represent a second-order statistic or representation of the delay. An estimated link-level jitter, $\tilde{\sigma}(t)$, may, for example, be determined or calculated using, for example, an equation such as:

$$\tilde{\sigma}(t)=\alpha \times \sigma(t)+(1-\alpha)\times(t-1)$$

The estimated link-level jitter, $\tilde{\sigma}(t)$, may, for example, be based on a currently measured jitter, $\sigma(t)$, a previously estimated (e.g., estimated at time t−1) jitter, $\tilde{\sigma}(t-1)$, a weighting factor, $\alpha$, and/or other variables.

Jitter may, in some embodiments, be calculated over a path 204 from source vehicle 202 to destination vehicle 206. Aggregate jitter over a path, $\sigma_{Path}(t)$ may, for example, be determined or calculated using, for example, an equation such as:

$$\sigma_{Path}(t) = \max_i(\sigma^i_{link}(t))$$

The jitter over a path 204 may, for example, be a maximum of the one or more link-level jitter values, $\sigma_{link}^i(t)$, along path 204.

Received signal strength indication (RSSI) may, in some embodiments, be a QoS metric or characteristic representing an average signal strength of a link between vehicles. An estimated link-level RSSI, $\tilde{S}(t)$, may, for example, be determined or calculated using, for example, an equation such as:

$$\tilde{S}(t)=\alpha \times S(t)+(1-\alpha)\times \tilde{S}(t-1)$$

The estimated link-level RSSI, $\tilde{S}(t)$, may, for example, be based on a currently measured RSSI, $S(t)$, a previously estimated (e.g., estimated at time t−1) RSSI, $\tilde{S}(t-1)$, a weighting factor, $\alpha$, and/or other variables.

RSSI may, in some embodiments, be calculated over a path 204 from source vehicle 202 to destination vehicle 206. Aggregate RSSI over a path, $S_{Path}(t)$, may, for example, be determined or calculated using, for example, an equation such as:

$$S_{Path}(t) = \min_i(S^i_{link}(t))$$

The RSSI over a path 204 may, for example, be a minimum of the one or more link-level RSSI values, $S_{link}^i(t)$ along path 204.

Figure 6A:
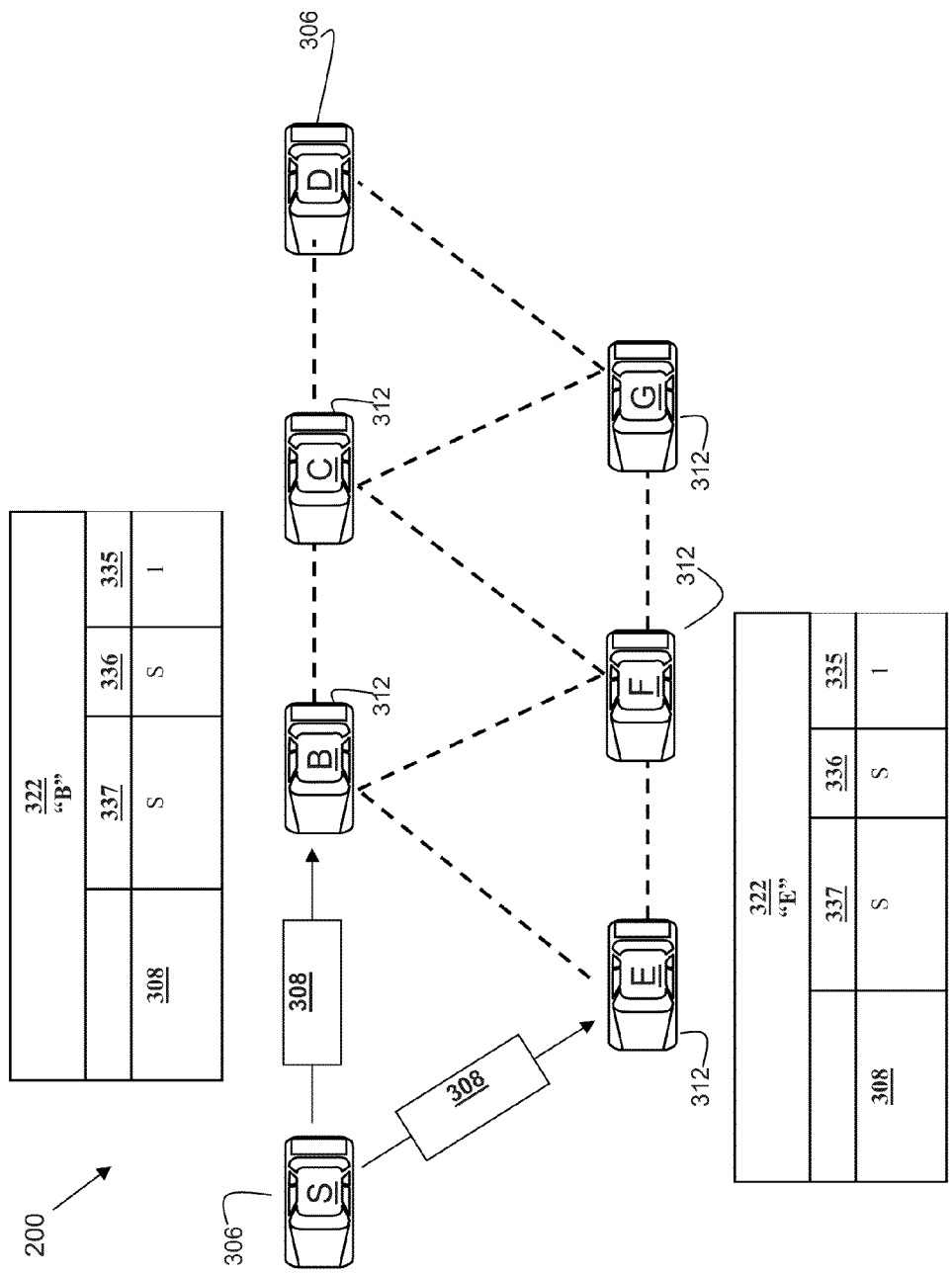
FIGS. 6A-6C depict subsequent stages of a request phase of a routing path search operation, respectively, according to embodiments.
Figure 6B:
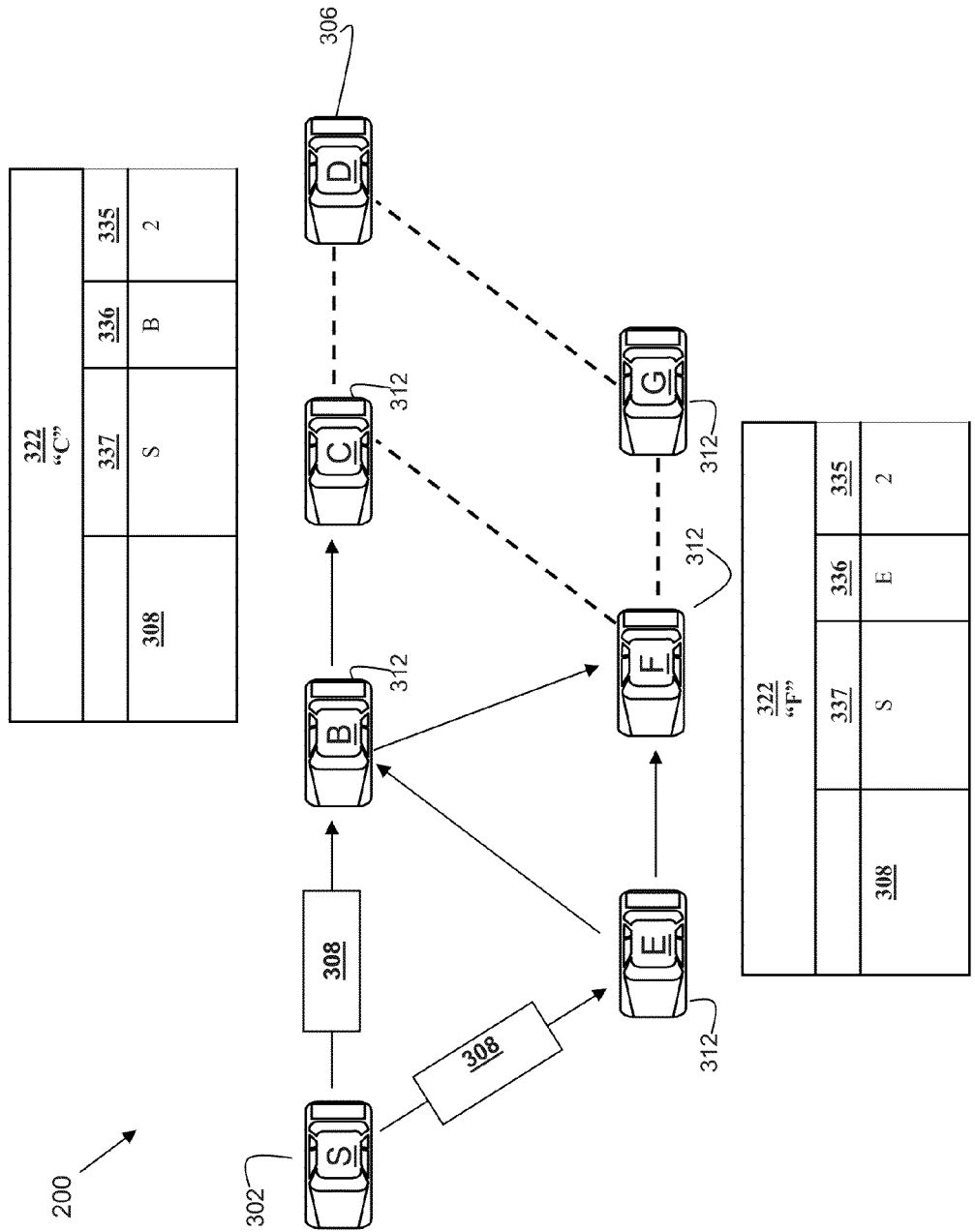
Figure 6C:
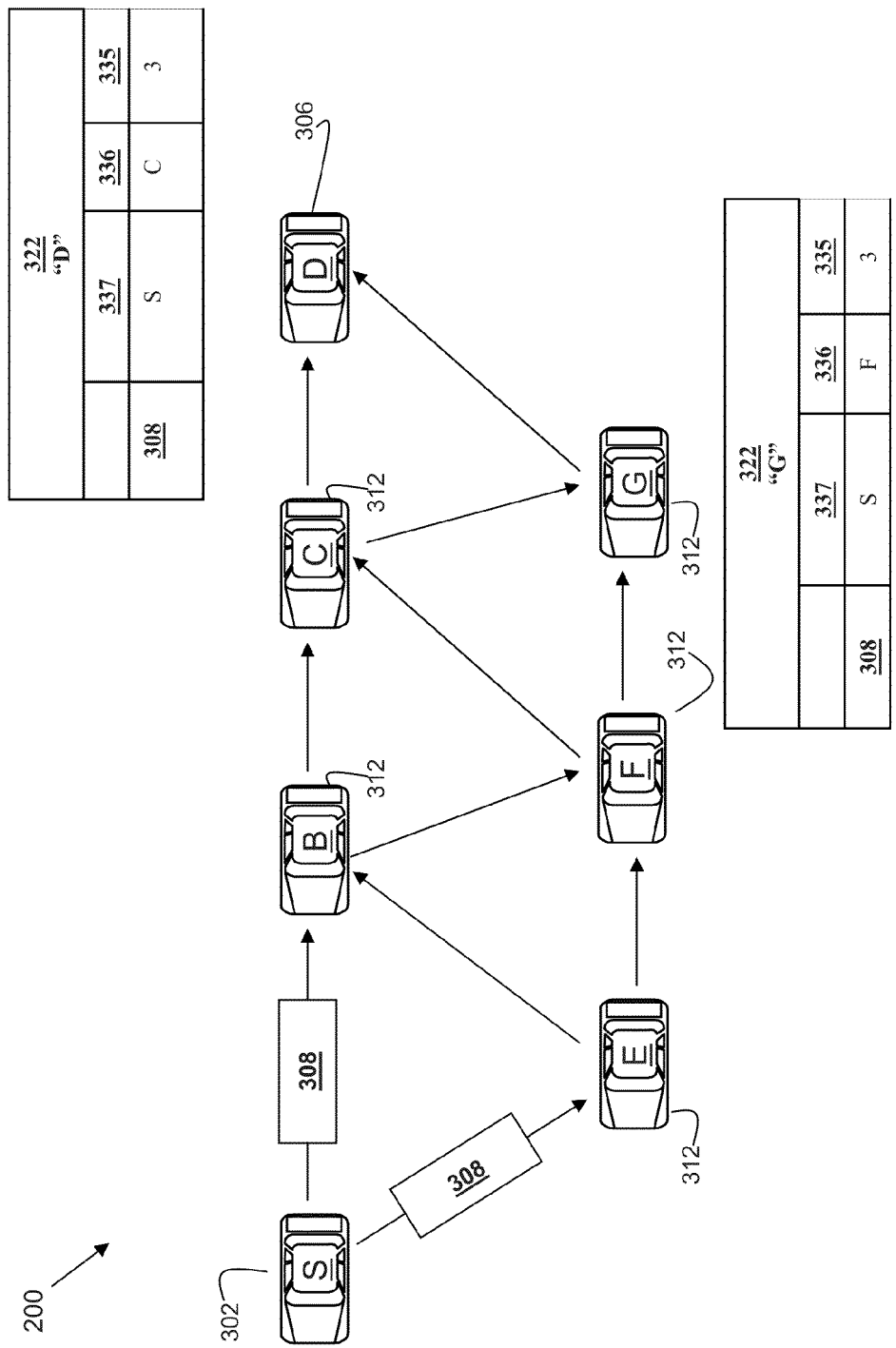

FIGS. 6A-6C are a schematic illustrations at different stages of request phase of routing path search and routing table generation in a vehicle information network, according to embodiments of the present invention.

FIG. 6A depicts a first stage of the request phase of the routing path search operation to destination vehicle 306. Specifically, source vehicle 302 (or a vehicle information network system 100 within or associated with the vehicle) may broadcast or flood a route request (RREQ) packet or message 308 to vehicle information network 200. RREQ packet 308 may, for example, include information identifying a destination vehicle or node 306. Route request packet 308 transmitted or broadcast from source vehicle 306 may be received at an intermediate vehicle 312 (e.g., a neighboring vehicle) located within a wireless data transmission range of source vehicle 302 (e.g., intermediate vehicle(s) 312). Intermediate vehicle(s) 312 or other vehicles may, for example, receive RREQ packet 308 and if intermediate vehicle 312 has previously received an identical RREQ packet 308, RREQ packet 308 may be discarded. If intermediate vehicle 312 has not previously received RREQ packet 308, intermediate vehicle(s) 312 may, for example, determine whether intermediate vehicle 312 is the destination vehicle for RREQ packet 308.

As shown in FIGS. 6A-6C if intermediate vehicle 312 is not destination vehicle 306, a routing entries, may be entered or stored in respective routing tables 322 associated with each intermediate vehicle 312; "A"-"D". Routing entry may, for example, include information describing or representing a path from intermediate vehicle 312 back to source vehicle 302, quality of service metric value(s) 335 (e.g., packet delivery ratio, delay, jitter or RSSI value), and other information. Information describing or representing a path from intermediate vehicle 312 to source vehicle 302 may include next vehicle entry 336 and a destination vehicle entry 337. Next vehicle entry 326 may be the next vehicle or neighboring vehicle on the path to source vehicle 302. Destination vehicle entry 337 may be the final or last vehicle on the path (e.g., source vehicle 302 of destination vehicle 306). The QoS metric value 335 entered or stored in routing table 322 may, for example, be determined based on the type of information to be transmitted to destination vehicle 306.

Intermediate vehicle 312, "B" or "E" may, for example, broadcast RREQ packet 308 to vehicle(s) neighboring intermediate vehicle 312, "C" or "F". If a neighboring vehicle is not destination vehicle 306 (e.g., neighboring vehicle is an intermediate vehicle 312), a routing entry 320 (e.g., including next vehicle entry 336, destination vehicle entry 337 and QoS metric value 335) and QoS metric values 335 may be entered in a routing table 322 associated with the respective intermediary vehicle. Routing entries may, for example, be used during a reply phase of the path establishment operation. Intermediate vehicle 312 may, for example, rebroadcast RREQ packet 308 to neighboring vehicles. The process of entering routing entries and QoS metric values 335 and re-broadcasting RREQ packet 308 may, for example, be repeated until RREQ packet 308 is received at destination vehicle 306. Destination vehicle 306 may, in some embodiments, receive RREQ packets 308 from one or more intermediate vehicles 312 via different paths (e.g., S→B→C→D and S→E→F→G→D or any other path in FIGS. 6A-6C). When it is described herein that a vehicle transmits or receives information, determines a path, or performs other functions, it is to be understood that a processor 60 or vehicle information network system 100 within or associated with the vehicle may perform these functions.

FIG. 6D is non-limiting, sample code that may be used to implement the route request stages of FIGS. 6A-6C, according to embodiments.

Figure 7A:
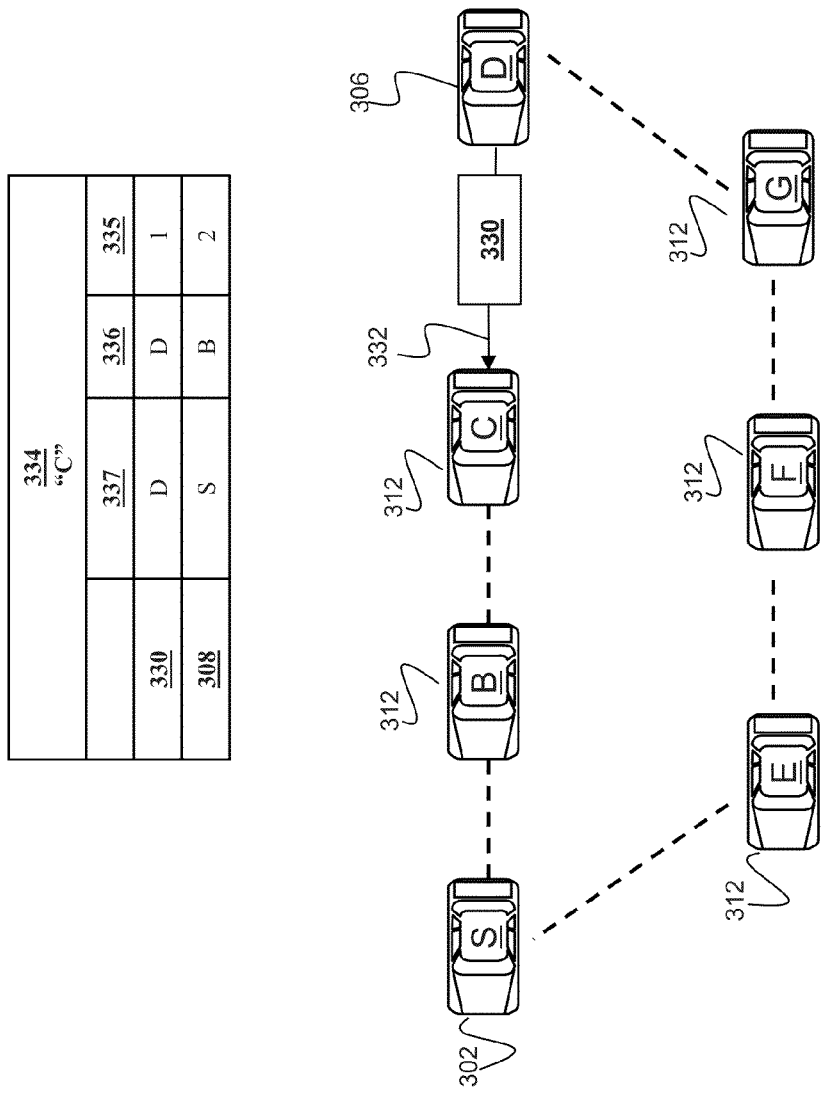
FIG. 7A-7C depict subsequent stages of a reply stage of routing path search operation, according to embodiments.
Figure 7B:
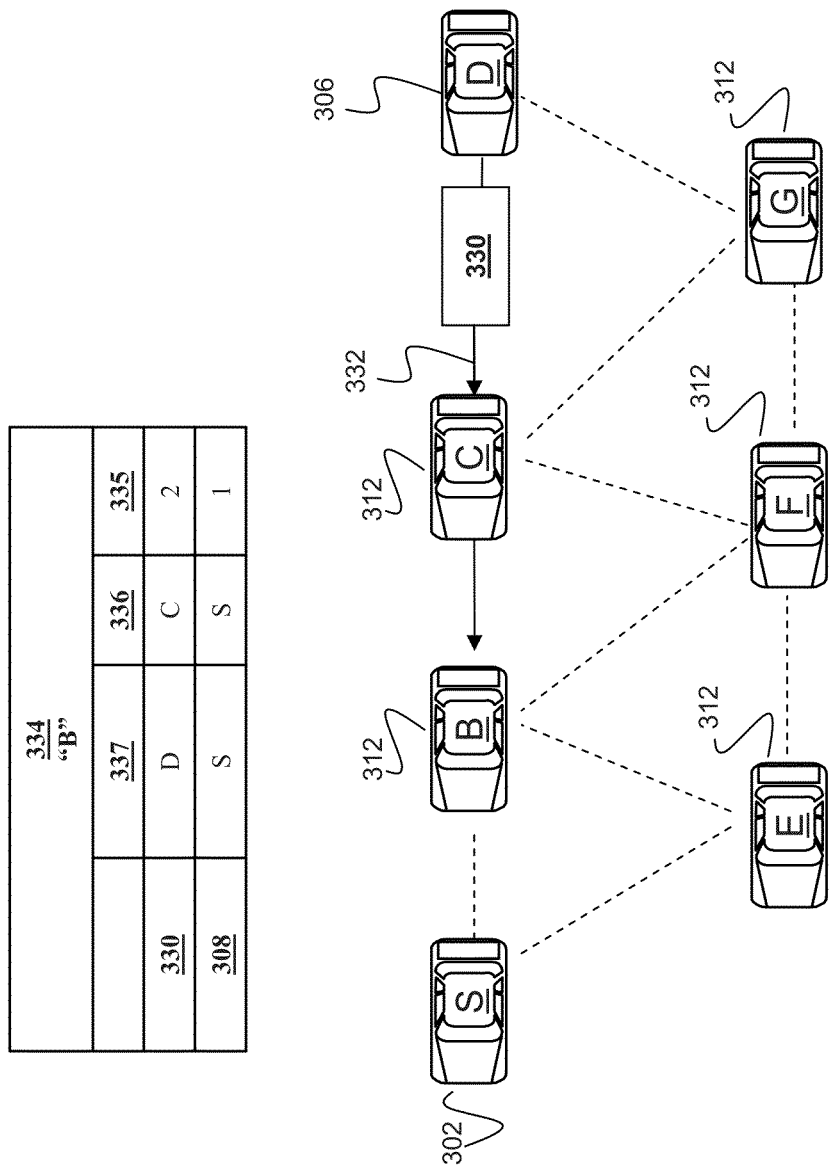
Figure 7C:
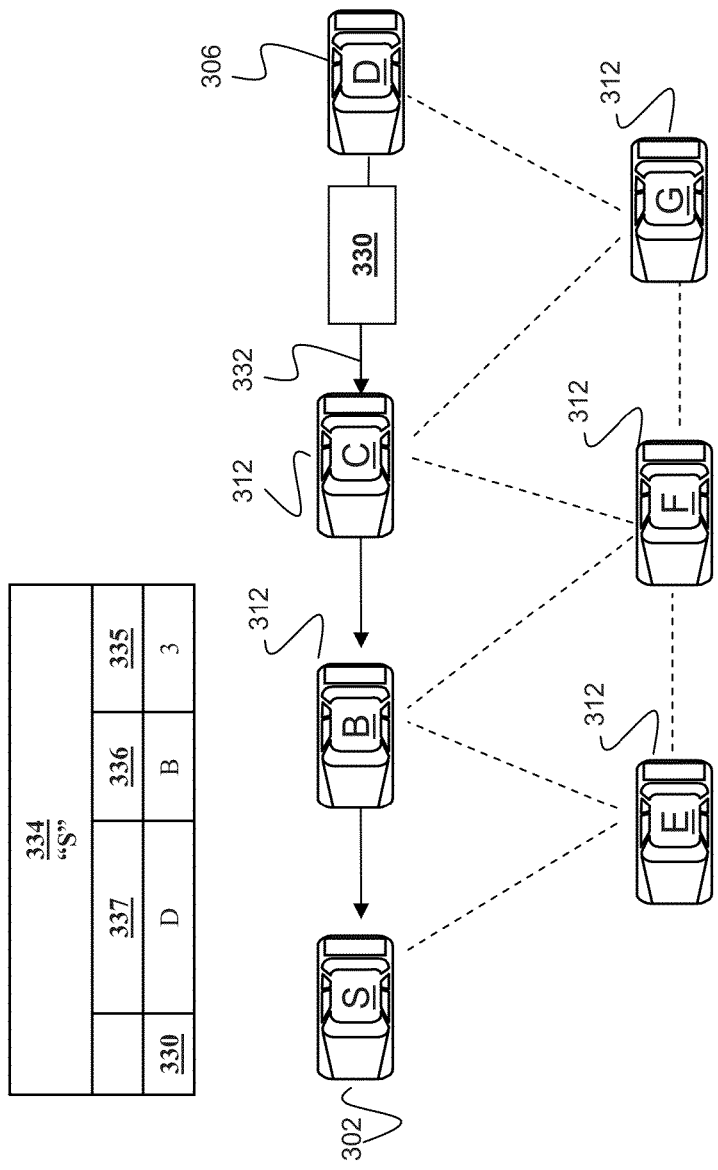

FIGS. 7A-7C are schematic illustrations of different stages and associated routing tables of a reply phase of the path search, according to embodiments of the present invention.

As shown in FIG. 7A after receipt of RREQ packets 308 by destination vehicle 306 via one or more routes, destination vehicle 306 may select the route or path 332 with the best quality of service metric value 335 (e.g., the route with the lowest QoS metric value 324) as determined during the request phase. Destination vehicle 306 may, for example, broadcast, unicast, or transmit a reply (RREP) message 330 along the path or route 332 from destination vehicle 306 to source vehicle 302 (e.g., through one or more intermediate vehicles 312, (i.e. "B", "C", "E", "F", and "G") with the highest quality of service (e.g., the route with the lowest QoS metric value 335). As Reply (RREP) message 330 travels back along route 332 each intermediate vehicle 312 may enter or generate QoS metrics 335 and routing entries, which may include information describing or representing a forward path to destination vehicle 306 (i.e. information that may be used during a second request phase if there is a need to identify an alternative routing path to destination vehicle 306). Information describing or representing a path to destination vehicle 306 may include a next vehicle entry 336 and a destination vehicle entry 337. Next vehicle entry 336 may be the next vehicle or neighboring vehicle on the path from intermediate vehicle 312 to destination vehicle 302. Destination vehicle entry 337 may be the final or last vehicle on the path (e.g., destination vehicle 306). Source vehicle 302 may receive RREP message 330 and may generate, add, or create a QoS metric 335 and routing table 334 to destination vehicle 306 in source vehicle routing table 338. Path or route 332 may be established as a data transfer route or established route or path 332 between source vehicle 302 and destination vehicle 306. When it is described herein that a vehicle transmits or receives information, determines a path, enters routing entry, or performs other functions, it is to be understood that a processor 60 or vehicle information network system 100 within or associated with the vehicle may perform these functions.

FIG. 7D is non-limiting, sample code that may be used to implement the stages of the response phase of the route search depicted in FIGS. 7A-7C, according to embodiments.

Figure 8:
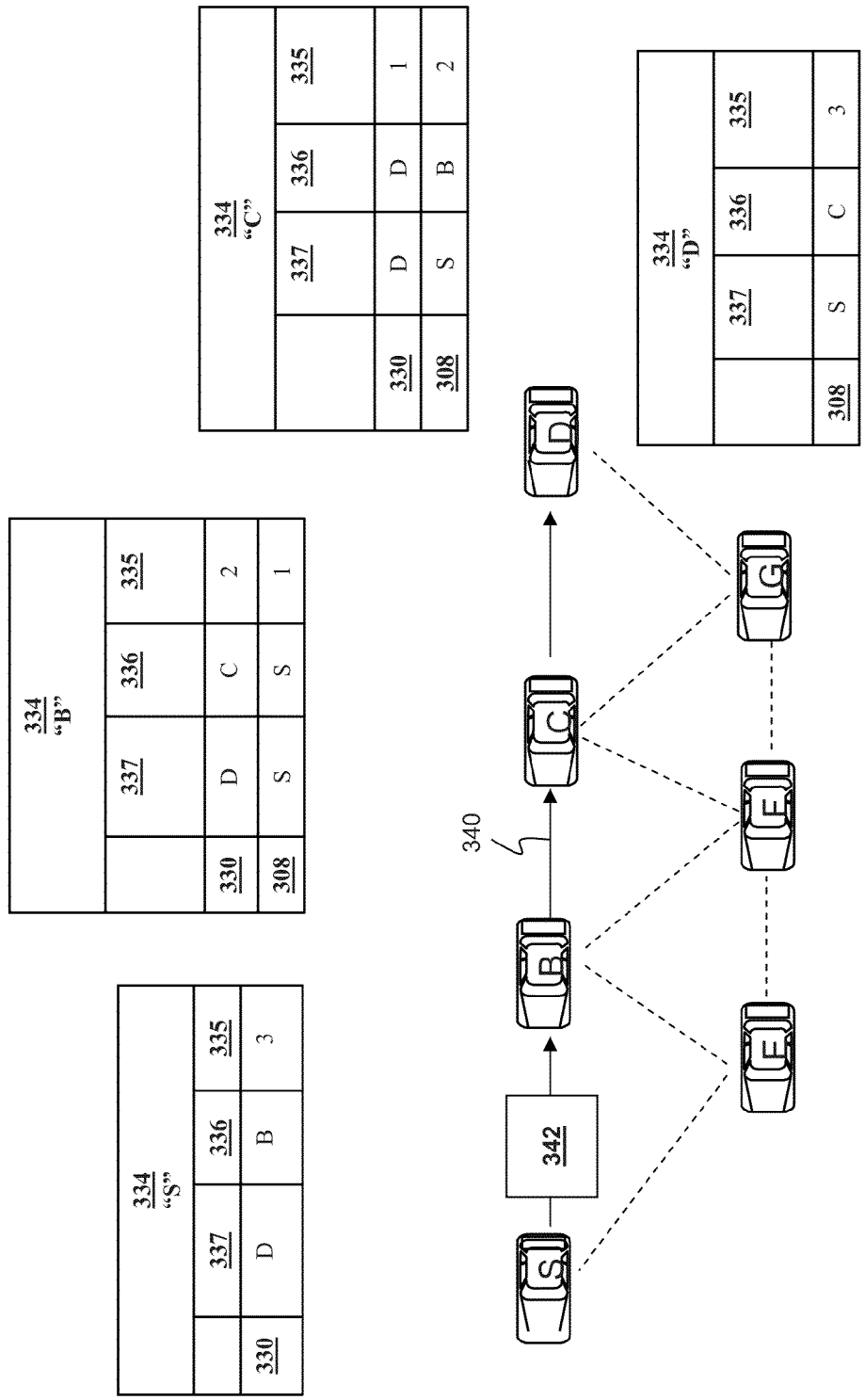
FIG. 8 is a schematic illustration of data streaming after a routing path has been established, according to embodiments of the present invention.

FIG. 8 is a schematic illustration of data transfer, or streaming in a mobile, wireless along now established routing path 340, according to embodiments of the present invention. Source vehicle 302 may transfer data 342 to destination vehicle 306, based on data routing tables 334, and specifically based on the path having the most favorable aggregate QoS metric value (i.e., along path 340 previously used for RREQ packet 308 and RREP packet 330, according to embodiments).

Figure 9A:
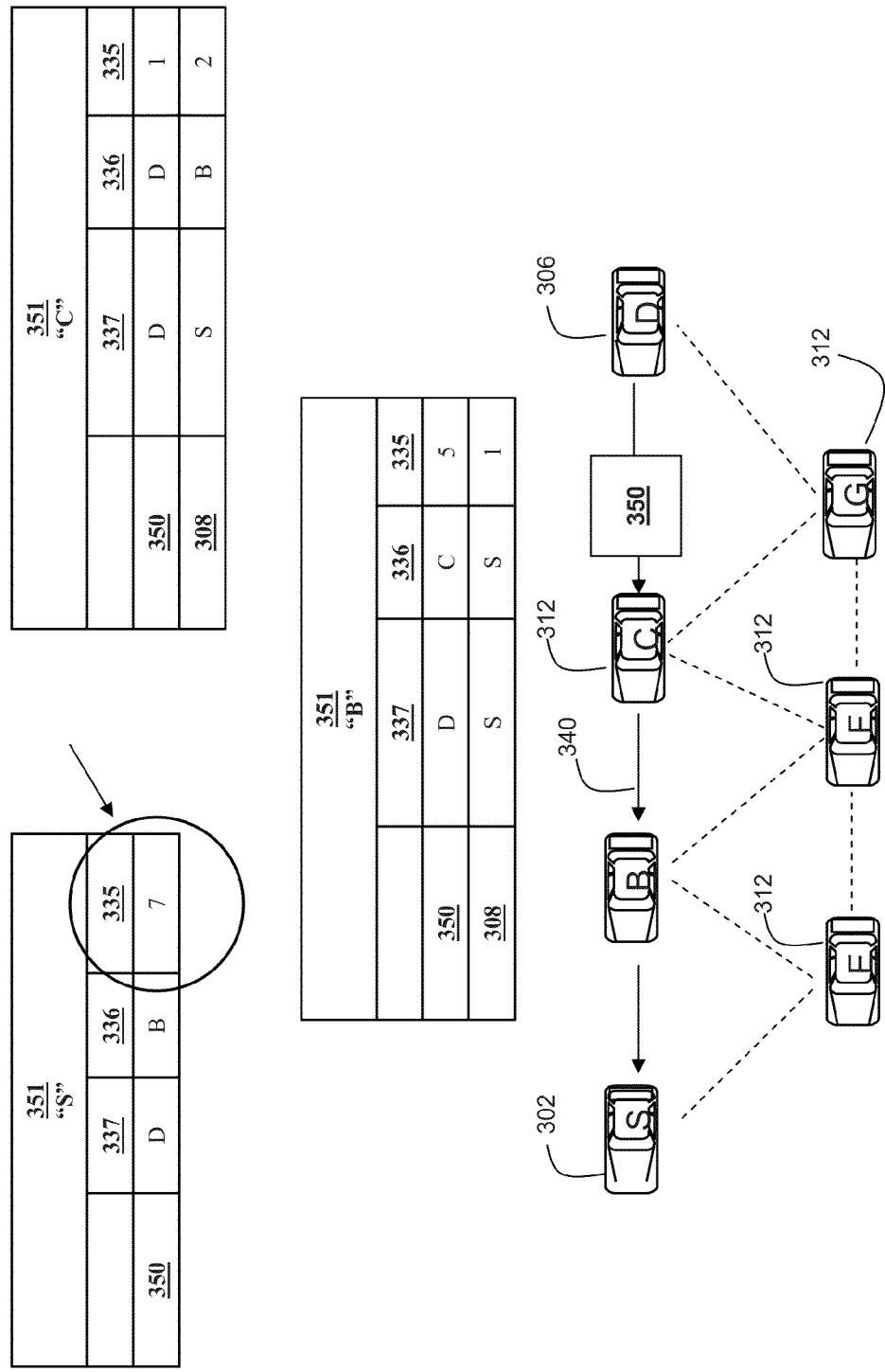
FIG. 9A is a schematic illustration of a quality of service monitoring operation in a vehicle information network according to embodiments of the present invention.

FIG. 9A is a schematic illustration of quality of service (QoS) monitoring of a maintenance operation in a vehicle information network according to embodiments of the present invention along an established routing path 340. Established route 340 between vehicles may, for example, be disrupted. Disruption in QoS may, for example, occur by a vehicle in path (e.g., an intermediate vehicle 312, or one of the end-point source and destination vehicles) moving out range of other vehicles, network congestion, unpredictable channel fading effects, or by other causes. As noted above, QoS metrics values shown in columns 335 may be monitored (e.g., by source vehicle 302 or another vehicle) to ensure an acceptable quality of service along each link of established route 340 by monitoring if the QoS metric remains within a predefined threshold.

Quality of service metrics may be transferred (e.g., from vehicle to vehicle) to source vehicle 302. Quality of service metric values appearing in columns 335 (e.g., packet delivery ratio, delay, jitter, RSSI, etc.) may be monitored as data 342 is transferred along an established route 340 between source vehicle 302 and destination vehicle 306. Quality of service metrics may be monitored in the links between vehicles (e.g. between source vehicle 302 and intermediate vehicle 312, between intermediate vehicles 312, and/or between intermediate vehicle 312 and destination vehicle 306).

Aggregate QoS metric 350 may, for example, be monitored along a plurality of links of the established route or path 340 or in its entirety. Designated in routing table 351 for vehicle "S", is a QoS metric value of "7" that exceeds an acceptable threshold and may cause an aggregate QoS, using this value, to also exceed and acceptable aggregate QoS threshold.

When an aggregate QoS metric indicates an imminent or possible reduction in transmission capability of routing path 340, a route error (RERR) packet 350 may be dispatched to source vehicle 302 to initiate measures directed at restoring the aggregate QoS.

FIG. 9B is non-limiting, sample code that may be used to implement the QoS maintenance operation of FIG. 9A, according to embodiments.

Source vehicle 302 may, in some embodiments, monitor quality of service metric values 350 and may compare quality of service metric values 350 to threshold quality of service metric values. If quality of metric values 350 in links between vehicles or along established path 340 between source vehicle 302 and destination 306 exceed threshold quality of service metric threshold values, source vehicle 302 may predict or estimate that the quality of service along established route 340 is no longer sufficient and initiates a search for an alternative, more robust routing path, according to embodiments.

Figure 10:
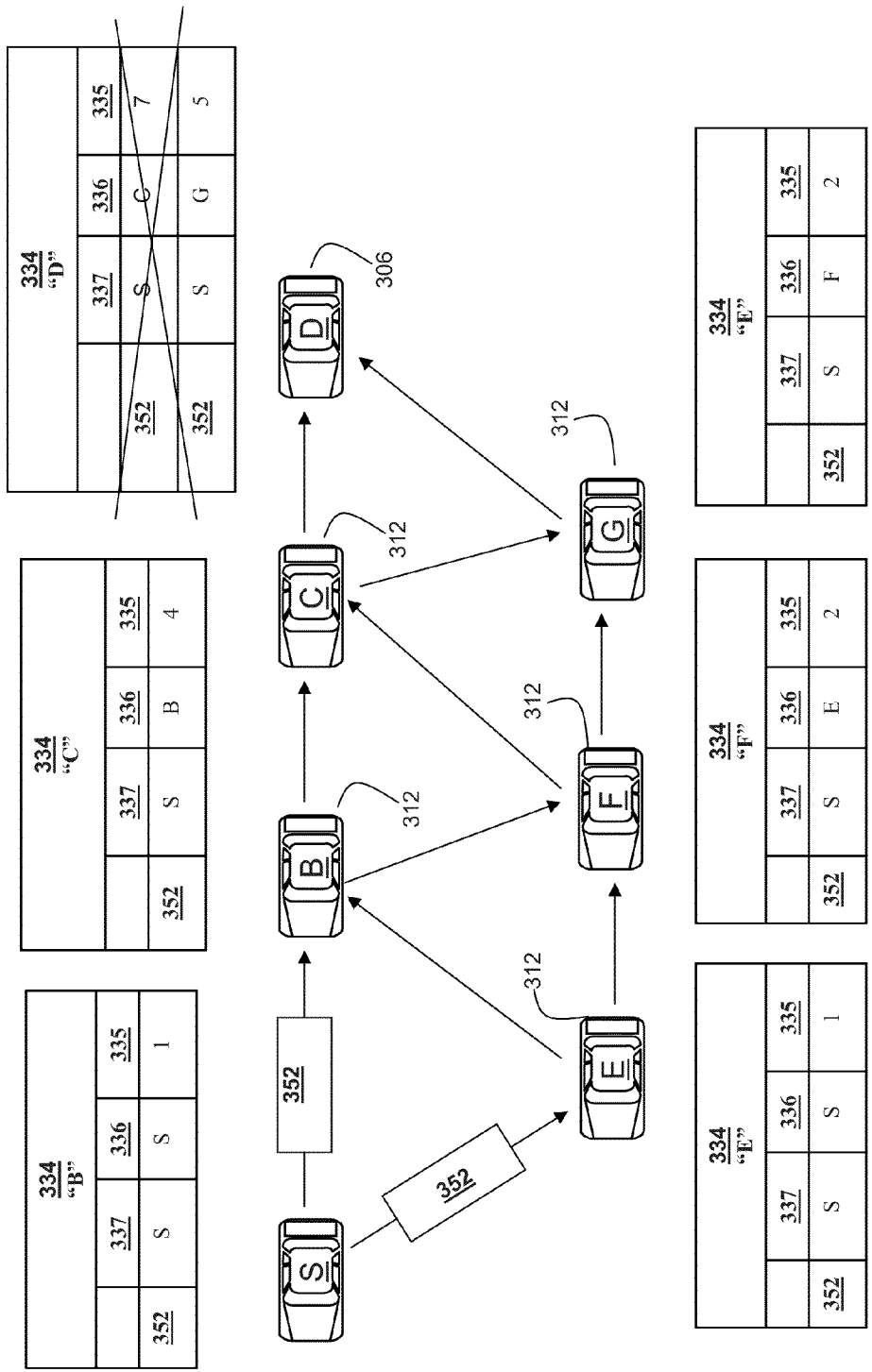
FIG. 10 is schematic illustration of a route quality resolution operation in a vehicle information network according to embodiments of the present invention.

FIG. 10 depicts all stages of a request phase of a new search operation for an alternative routing path to preempt significant reduction of transmission capability the current routing path. As noted above, source vehicle 302 may, for example, establish a new route by broadcasting or flooding the network with a route request (RREQ) message 352. Similar to the original RREQ message 308, RREQ message 352 may be received by neighboring vehicles (e.g., intermediate vehicle(s) 312). If intermediate vehicle 312 has previously received an identical RREQ packet 352, RREQ packet 352 may be discarded. If intermediate vehicle 312 has not previously received RREQ packet 352, intermediate vehicle(s) 312 may, for example, determine whether intermediate vehicle 312 is the destination vehicle for RREQ packet 352. If intermediate vehicle 312 is not destination vehicle 306, a QoS metric and routing entry 320 may be entered in a routing table 322. Intermediate vehicle 312 may, for example, broadcast RREQ packet 352 to vehicle(s) neighboring intermediate vehicle 312. Neighboring vehicles may receive RREQ packet 352. Intermediate vehicle 312 may, for example, enter QoS metric values and routing table entries and rebroadcast RREQ packet 352 to neighboring vehicles. The phase of re-broadcasting RREQ packet 352 may, for example, be repeated until RREQ packet 352 is received at destination vehicle 306. Destination vehicle 306 may, in some embodiments, receive RREQ packets 352 via multiple different paths (e.g., S→B→C→D and S→E→F→G→D in FIG. 6). When it is described herein that a vehicle transmits or receives information, determines a path, or performs other functions, it is to be understood that a processor or vehicle information network system 100 within or associated with the vehicle may perform these functions. During the rebroadcast, upgraded QoS metric values are generated and may be used as a basis for identifying the alternative routing path during the reply phase and subsequent data streaming, according to embodiments.

For example, an updated set of routing tables 334 is generated during the request phase for each intermediary vehicle 312, "B"-"G" and destination vehicle 306, or vehicle "D". As noted above, each routing table includes updated "Destination", "Next vehicle", and "QoS metric value" entries, respectively, according to embodiments. As shown, one of two potential paths are chosen on the basis of these updated QoS metric values. Specifically, in the upcoming reply phase a reply packet will transmitted either through vehicle "C" or through vehicle "G". Based on a comparison of the respective QoS metric values or their relationship to a threshold value, a routing path through vehicle G" will be chosen in view of the move favorable QoS value of "5" associated with vehicle "G" as opposed to the QoS value of "7", associated with vehicle "D", according to embodiments.

Figure 11:
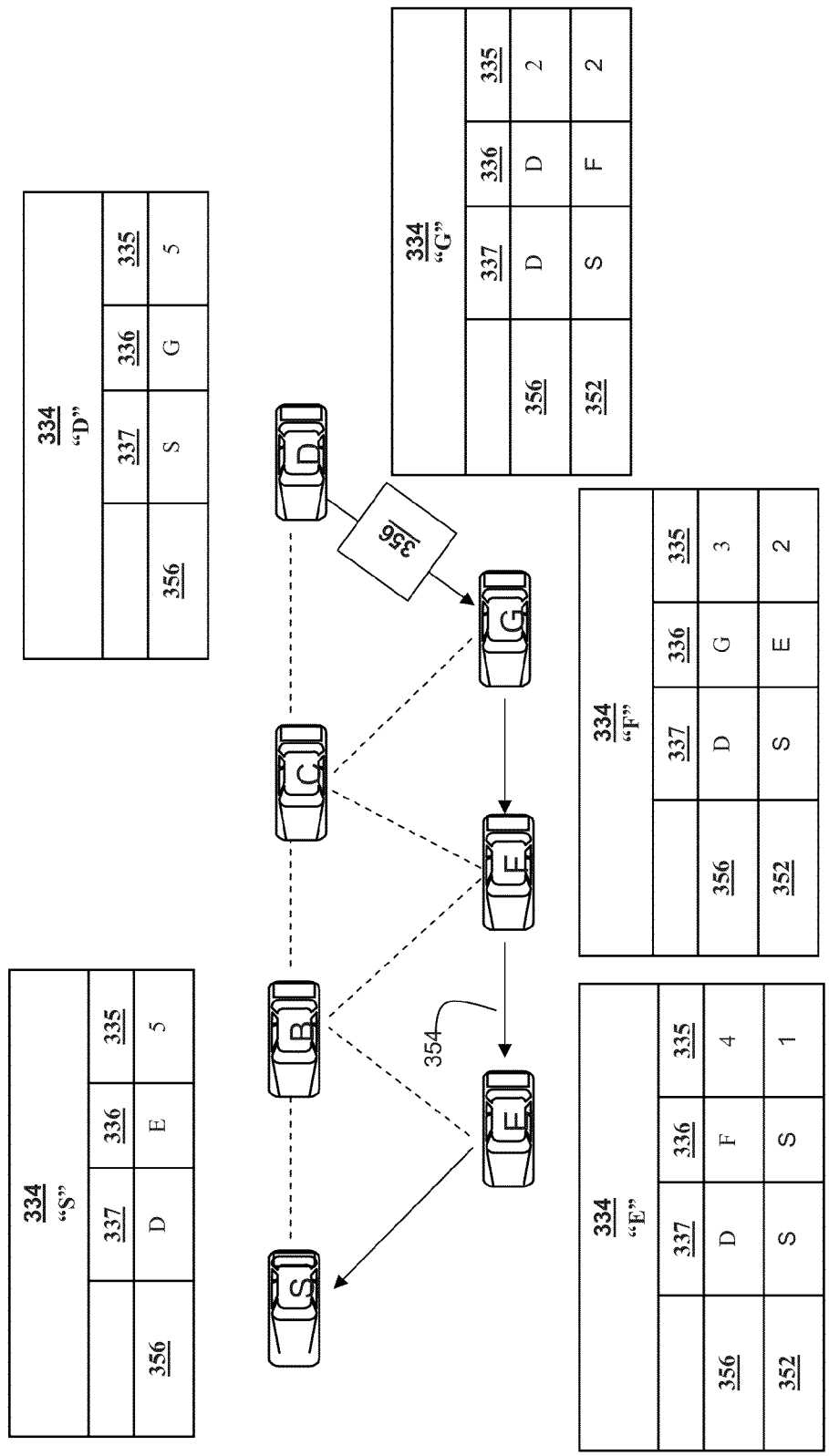
FIG. 11 is schematic illustration of a reply message transmission operation in a vehicle information network according to embodiments of the present invention.

FIG. 11 is schematic illustration of a reply phase in a vehicle information network according to embodiments of the present invention. As noted above, destination vehicle 306 may receive one or more RREQ packets 352 along one or more routes or paths as shown in FIG. 10. Destination vehicle 306 may determine the route or path with the best quality of service metric 335 (e.g., the route with the lowest QoS metric value 335). Destination vehicle 306 may, for example, broadcast, unicast, or transmit a reply (RREP) message 356 along the route 354 with the highest quality of service (e.g., the route with the lowest QoS metric value 335). Source vehicle 302 may receive RREP message 356 and may generate, routing entries, including information describing or representing a return path to destination vehicle 306 like "Next Vehicle" 336, "Destination Vehicle" 337 wherein "Next vehicle" 336 may refer to a neighboring vehicle on the path to destination vehicle 302, and "Destination Vehicle" may refer to the final or last vehicle on the path (e.g., destination vehicle 306) as noted above. Path or route 354 may be established as a data transfer route or established route or path 354 between source vehicle 302 and destination vehicle 306.

Figure 12A:
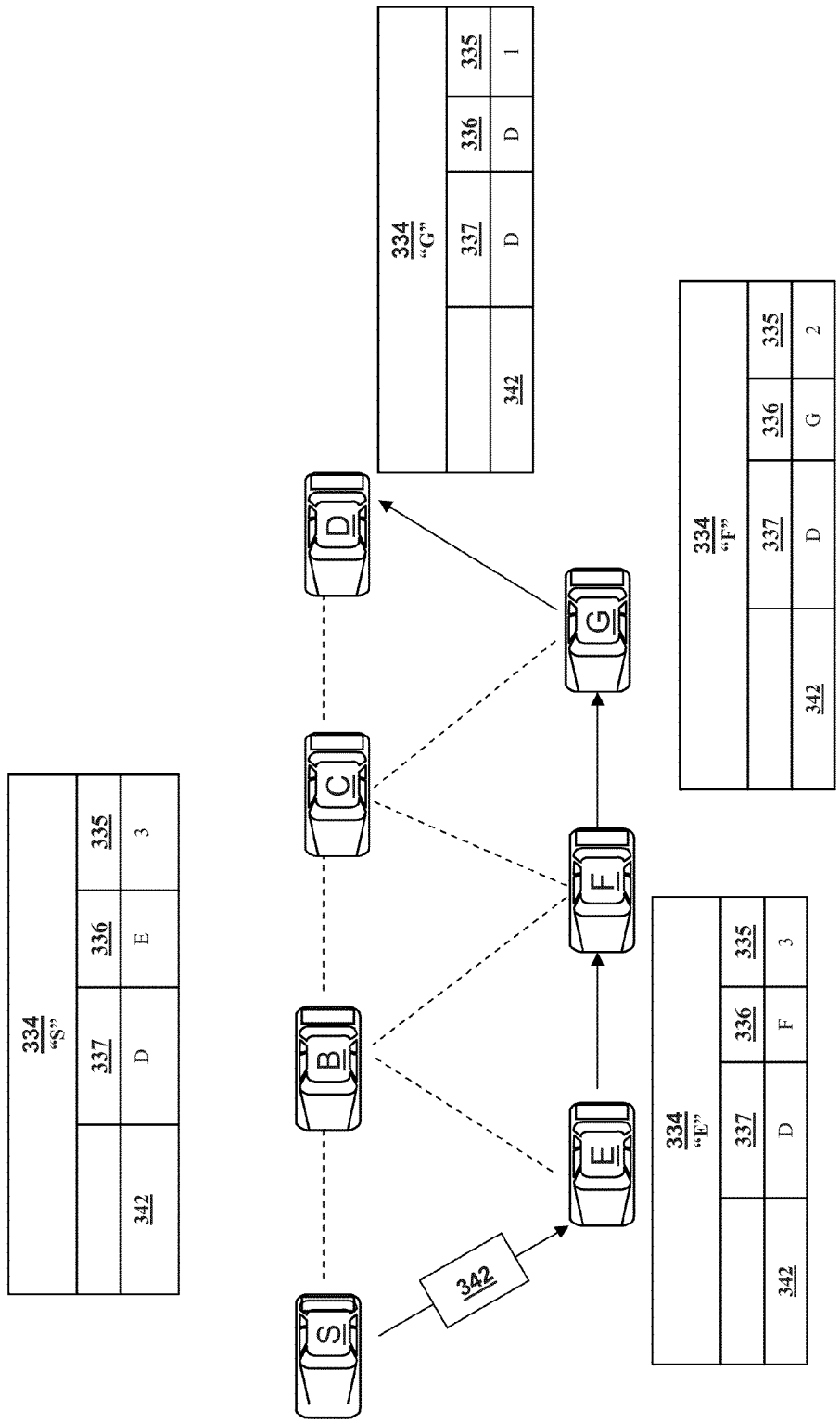
FIG. 12A is a schematic illustration of a seamless data transfer in a vehicle information network, according to embodiments of the present invention.

FIG. 12 is a schematic illustration of a seamless data transfer in a vehicle information network according to embodiments of the present invention, (i.e. transfer of data streaming has been executed prior to a loss of QoS to the point in which the streaming is impaired or disrupted). Source vehicle 302 may, in some embodiments, seamlessly migrate, change or alter data transfer to established route 354 from previous routing path 340 appearing in FIG. 8. By seamlessly migrating to newly established route 354, a user operating an application based on or using data 342 may, for example, not notice any service interruption due to the route migration. Source vehicle 302 may, using routing entries in source vehicle routing table 334, transfer data 342 to destination vehicle 306, according to embodiments.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for route migration in a vehicular mobile wireless network, the method comprising:
   monitoring an operational Quality of Service (QoS) metric of each node of a mobile wireless network streaming data packets, each of the nodes associated with a separate vehicle;
   broadcasting, from a source node of the network, a plurality of routing requests for an alternative routing path from the source node to a destination node of the network while the network is streaming the data packets, the broadcasting implemented responsively to detection of a degradation of the operational QoS metric to a threshold value indicative of imminent impairment of packet data transmission capability of one or more of the nodes;
   rebroadcasting the routing requests from each of a plurality of intermediary nodes of the network to the destination node, each of the intermediary nodes having received the initial routing request;
   tracking new Quality of Service (QoS) metric values for passage of the routing requests through each of the intermediary nodes,
   receiving at the destination node each of the routing requests through different alternative routing paths from the source node, each of the alternative routing paths having a its respective aggregate QoS metric value based on the new QoS metric values of the intermediary nodes;
   redirecting at the source node the streaming data from the wireless data transfer path to the alternate routing path having a most favorable aggregate QoS,
   wherein the monitoring and the tracking are implemented at one or more of the nodes of the mobile wireless network.

2. The method of claim 1, wherein the QoS metric value is measured in terms of pocket delivery ratio (PDR).

3. The method of claim 1, wherein the QoS metric value is measured in terms of link-level jitter.

4. The method of claim 1, wherein the QoS metric value is measured in terms of estimated link-level delay.

5. The method of claim 1, wherein the QoS metric value is measured in terms of received signal strength information (RSSI).

6. A mobile, wireless network system for route migration, the system comprising:
   a mobile source node; and
   a mobile destination node in wireless communication with the mobile source node via a plurality of mobile intermediary nodes, each of the nodes associated with a separate vehicle, the system configured to:
      monitor an operational Quality of Service (QoS) metric of each node of a mobile wireless network streaming data packets;
      broadcast, from the source node of the network, a plurality of routing requests for an alternative routing path from the source node to the destination node while the network is streaming the data packets, the broadcast implemented responsively to detection of a degradation of the operational QoS metric to a threshold value indicative of imminent impairment of packet data transmission capability of one or more of the nodes;
      rebroadcast the routing requests from each of a plurality of the intermediary nodes to the destination node, each of the intermediary nodes having received the initial routing request;
      track new Quality of Service (QoS) metric values for passage of the routing requests through each of the intermediary nodes;
      receive, at the destination node, each of the routing requests through different alternative routing paths from the source node, each of the alternative routing paths having its respective aggregate QoS metric value based on the new QoS metric values of the intermediary nodes;
      migrate the streaming data from the wireless data transfer path to the alternate routing path having a most favorable aggregate QoS,
   wherein QoS monitoring is implemented from one or more of the vehicles.

7. The system of claim 6, wherein the QoS metric value is measured in terms of pocket delivery ratio (PDR).

8. The system of claim 6, wherein the QoS metric value is measured in terms of link-level jitter.

9. The system of claim 6, wherein the QoS metric value is measured in terms of estimated link-level delay.

10. The system of claim 6, wherein the QoS metric value is measured in terms of received signal strength information (RSSI).

* * * * *